United States Patent
Tanaka et al.

(10) Patent No.: US 6,671,236 B2
(45) Date of Patent: Dec. 30, 2003

(54) LIGHT RECEIVING AND EMITTING COMPOUND ELEMENT AND OPTICAL PICK-UP DEVICE USING THE SAME

(75) Inventors: Haruo Tanaka, Kyoto (JP); Masahiko Tsumori, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 445 days.

(21) Appl. No.: 09/754,381

(22) Filed: Jan. 5, 2001

(65) Prior Publication Data

US 2001/0007543 A1 Jul. 12, 2001

(30) Foreign Application Priority Data

Jan. 7, 2000 (JP) .................................... 2000-005978
Dec. 22, 2000 (JP) .................................... 2000-391520

(51) Int. Cl.[7] .............................................. G11B 7/00
(52) U.S. Cl. .............................. 369/44.23; 369/44.12
(58) Field of Search ..................... 369/44.23, 44.42, 369/44.12, 112.05, 112.06, 112.7, 112.12, 112.27, 112.28, 112.07, 121

(56) References Cited

U.S. PATENT DOCUMENTS 5,406,543 A * 4/1995 Kobayashi et al. ......... 369/121
5,416,765 A * 5/1995 Aikoh et al. .............. 369/44.23
5,627,806 A * 5/1997 Kobayashi ................ 369/44.23
5,986,996 A * 11/1999 Kitamura et al. ........ 369/44.12
6,167,017 A * 12/2000 Higashiura et al. ...... 369/44.41

* cited by examiner

Primary Examiner—Thang V. Tran
(74) Attorney, Agent, or Firm—Arent Fox Kintner Plotkin & Kahn, PLLC (57) ABSTRACT

A light emitting portion (1) and an objective lens (3) for collecting a light of the light emitting portion are provided. The light receiving portion (2) is provided in the vicinity of the light emitting portion (1) such that the light can be collected by the objective lens and the light reflected by an optical disk (10) to be an object can be detected. The light emitting portion and the light receiving portion are formed to get in a range of 1.22 λ/NA (beam waist BW) wherein a numerical aperture of the objective lens is represented by NA and a wavelength of the light emitting portion is represented by λ or the light receiving portion is multi-split such that a focal shift of a beam having an astigmatism formed thereon can be detected. As a result, it is possible to obtain a light receiving and emitting compound element capable of surely detecting a focal position without adjusting a positional relationship between the light emitting portion and the light receiving portion and an optical pick-up device capable of being easily assembled and of detecting and correcting a shift in a focus or a tracking with a high sensitivity.

13 Claims, 10 Drawing Sheets

LIGHT RECEIVING AND EMITTING COMPOUND ELEMENT AND OPTICAL PICK-UP DEVICE USING THE SAME

FIELD OF THE INVENTION

The present invention relates to a light receiving and emitting compound element which is suitable for modifying focus errors and tracking errors of an optical pick-up device to be used for recording and reproducing an optical disk such as a CD-ROM, a CD-R, a DVD-ROM or an MD and correcting an image forming position to automatically form an image of a microdisplay provided in front of eyes on a human retina, and to an optical pick-up device using the light receiving and emitting compound element. More specifically, the present invention relates to a photodetector capable of accurately detecting reflected light corresponding to the situation of reflection on an object without precisely adjusting the position of an optical system to align a light emitting portion with a light receiving portion and of detecting a shift in a direction of a focal point and a shift in an xy plane (in a tracking direction), and to an optical pick-up device using the photodetector.

BACKGROUND OF THE INVENTION

A pit for recording information of an optical disk acting as an information recording medium has a size of approximately 0.9 μm, and a train (track) of the pit is arranged with a small pitch of approximately 1.6 μm. In an actual optical pick-up device, therefore, a pit should be detected while correcting a shift in a focus or the like which is caused by a displacement in a direction perpendicular to a direction of the track, a rotation slippage of the optical disk or the like. As a method for correcting the shift in the focus, there have conventionally been used an astigmatism method comprising the steps of separating a received signal light reflected by an optical disk from a transmitted signal light through a half lens or a beam splitter, forming an astigmatism through a cylindrical lens or the like and receiving the light by means of a 4-split sensor to detect a shift in a focus, a Foucault method for detecting a shift in a focus depending on whether or not a light reflected by an optical disk forms a focal point on an apex angle of a prism by using the prism, for example, and the like.

Figure 15:
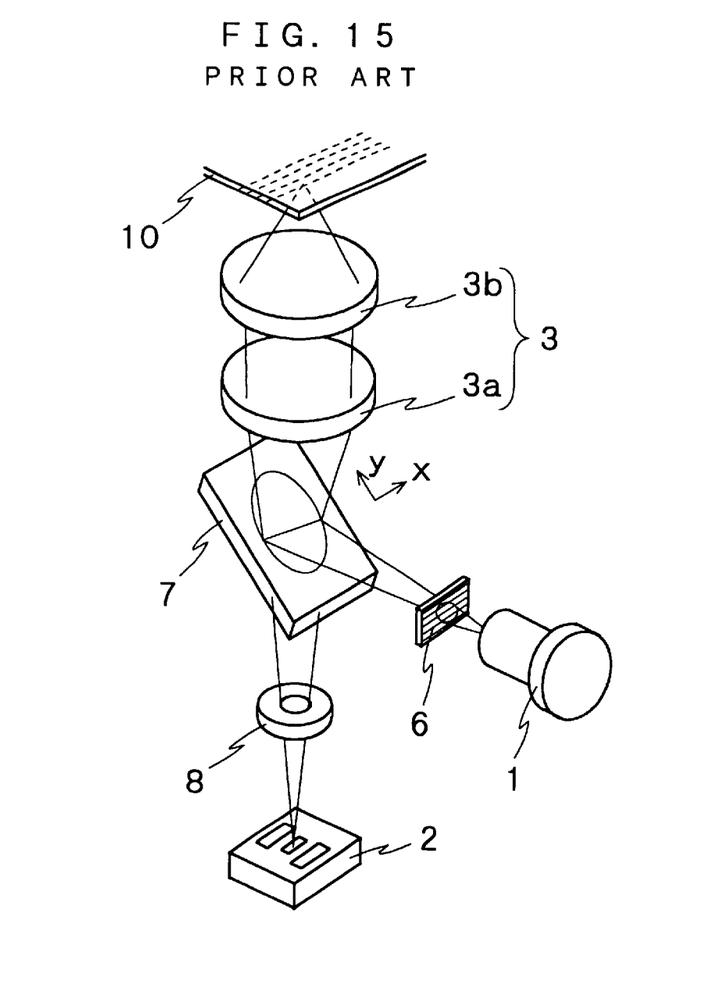
FIG. 15 is a diagram illustrating an example of a structure of a conventional optical pick-up device.

As an example of an optical pick-up device using the astigmatism method, for example, as shown in FIG. 15, a light transmitted from a light source such as a laser diode (which will be hereinafter referred to as an LD) 1 is diffracted through a diffraction grating 6 to generate a beam for a tracking servo (a 3-beam method), the beam is reflected by a half mirror 7 and is collected on a pit of an optical disk 10 through a lens system 3 including a collimator 3a, an objective lens 3b and the like, the reflected light is received by a light receiving element 2 such as a photodiode through the objective lens 3b, the collimator 3a, the half mirror 7 and a concave lens 8, and a size of the pit of the optical disk 10 is detected while carrying out a focus servo and a tracking servo so that information is read out.

In this example, a half mirror plane is formed as the half mirror 7 on a surface of a thick transparent substrate without using a cylindrical lens. Consequently, 50% of the light transmitted from the LD1 is reflected by the surface and is transmitted to the optical disk 10 without a distortion, and half of the light reflected by the optical disk 10 and returned is refracted through the thick half mirror 7 and is then transmitted to the light receiving element 2. In this case, the half mirror 7 has an inclination in a constant direction in order to reflect the light transmitted from the LD1 toward the optical disk 10 side. All convergent beams reflected and returned which enter an x-axis of FIG. 15 have equal angles of incidence with respect to the inclined surface of the half mirror 7, while convergent beams entering a y-axis have different angles of incidence with respect to the inclined surface in a y-axis direction. For this reason, while a position of a convergent point is changed, all the beams in an x direction which enter the x-axis are refracted in the same manner and are simply moved in parallel so that a distortion is not generated. Consequently, an astigmatism is generated. By utilizing the astigmatism, the focus servo is carried out.

Figure 16:
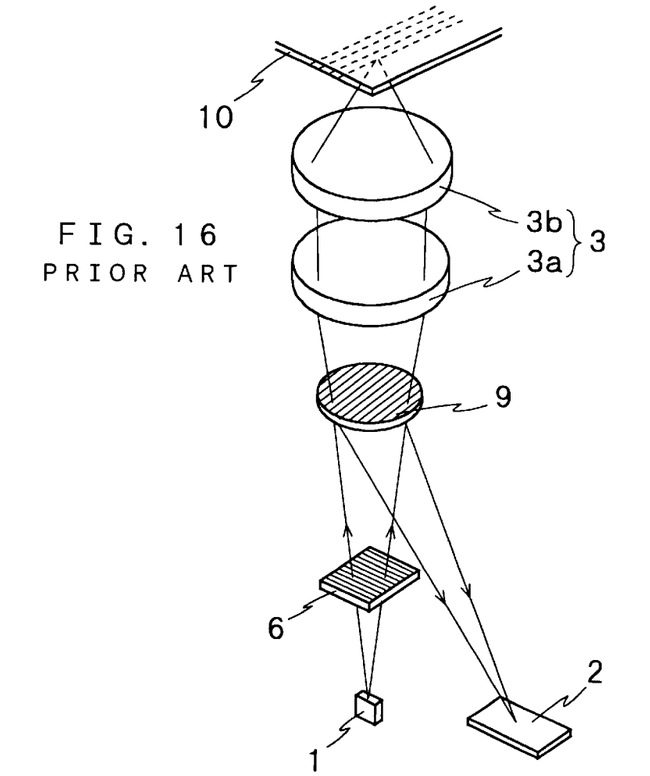
FIG. 16 is a diagram illustrating an example of the structure of the conventional optical pick-up device.

The example using a hologram applying the Foucault method, moreover, as shown in FIG. 16, a laser beam transmitted from the LD1 is diffracted through the diffraction grating 6 to generate a beam for a tracking servo (the 3-beam method) and is then collected on a pit of the optical disk 10 through a hologram (diffracting element) 9 provided on the top surface of the diffraction grating 6 and the lens system 3 including the collimator 3a and the objective lens 3b, the reflected light is transmitted through the objective lens 3b, the collimator 3a and the hologram 9, and a primary diffraction signal diffracted through the hologram 9 is received by the light receiving element 2 so that information is read out in the same manner described above. The hologram 9 has the functions of a plane beam splitter and a Foucault prism in the conventional optical pick-up device and uses the principle of the Foucault method.

These methods have a problem in that the light emitting element 1 and the light receiving element 2 are provided in different positions and are therefore aligned with much difficulty. More specifically, an area of the light receiving element 2 should be very reduced in order to recognize a shift in a focal point or the like. In order to receive the reflected light through the very small light receiving element 2, the light receiving element 2 should be provided accurately in the convergent position of the reflected light. As a method for solving such a problem, there has been known a structure shown in FIG. 17.

Figure 17A:
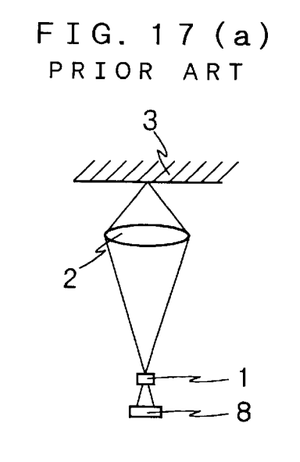
FIGS. 17(a) and 17(b) are diagrams illustrating another structure of the conventional optical pick-up device.
Figure 17B:
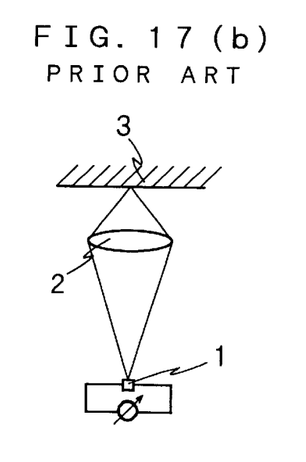

A structure shown in FIG. 17(a) is referred to as a so-called L-SCOOP (Self Coupled Optical Pickup) method utilizing a change in an amount of detection through a light receiving element 61 for a monitor provided behind the LD1 because a light irradiated from the LD1 and reflected by the optical disk 10 and then returned is exactly returned to the LD1 and an oscillation state of the LD1 is changed by the reflected light thus returned. A structure shown in FIG. 17(b) is referred to as a so-called E-SCOOP method in which a change in the oscillation state of the LD1 through the reflected light is directly detected depending on a change in a driving current or terminal voltage of the LD in the same manner.

In the case in which a light beam transmitted from a light source is irradiated on an object such as an optical disk and the reflected light is received to detect information or the like as in the above-mentioned optical pick-up device, light paths for reciprocation should be separated by using a beam splitter, a hologram or the like and a light emitting element and a light receiving element should be assembled by separate parts. For this reason, it is necessary to carefully adjust mutual optical axes of the light emitting element and the light receiving element and a distance therebetween, thereby carrying out assembly. However, the work is very complicated and only the skilled can carry out the assembly.

In the optical pick-up device using the astigmatism method, an expensive part such as a hologram is not required and it is sufficient that a half mirror plane is formed on the surface of the transparent substrate. Although parts are inexpensive, this structure also requires a half mirror and uses the 3-beam method to require a diffraction grating. All these parts are discrete and the number of the parts is increased, resulting in an increase in a cost. In addition, the relationship between the LD and the light receiving element which are aligned carefully should be prevented from being changed due to a temperature or the like. Therefore, a case or the like should be manufactured by an expensive material such as engineering plastics which is deformed by heat with difficulty. Consequently, the cost of the parts is increased. For this reason, there is a problem in that a manufacturing cost is increased.

In the SCOOP method, moreover, the alignment can be carried out very easily. However, the amount of a change caused by a shift is very small and reading reliability is maintained with difficulty. Therefore, the SCOOP method has not been put into practical use.

SUMMARY OF THE INVENTION

In order to solve the problems, it is an object of the present invention to provide a light receiving and emitting compound element capable of detecting a change in a reflected light due to a shift with a high sensitivity without adjusting the positional relationship between a light emitting portion and a light receiving portion, thereby surely detecting a focal position of an object and the like.

It is another object of the present invention to provide an optical pick-up device capable of being assembled easily and of detecting and correcting a shift of a focus or tracking with a high sensitivity by using the light receiving and emitting compound element.

It is yet another object of the present invention to provide an optical pick-up device in which a light emitting portion and a light receiving portion are formed in almost the same places, a beam irradiated from the light emitting portion to an optical disk rarely causes an astigmatism and a light reflected from the optical disk and returned to the light receiving portion causes the astigmatism, and a focus servo can be carried out by an astigmatism method.

It is a further object of the present invention to provide an optical pick-up device capable of being assembled very easily without using an expensive part such as a diffraction grating also in the case in which a 3-beam method is used.

In order to solve the above-mentioned problems, the present inventor has made investigations vigorously. As a result, the following has been found. More specifically, a reflected light passing through an objective lens has such a property that a diameter of a beam (beam waist) which becomes the thinnest during collection is determined to be constant depending on a numerical aperture NA of the lens by the influence of diffraction of the lens, and the light emitting portion and the light receiving portion are formed in the beam diameter by utilizing the property so that only an intensity of the reflected light can be detected separately from the light emitting portion without separating the reflected light from a main beam.

A light receiving and emitting compound element according to the present invention comprises; a light emitting portion to irradiate a light toward an object through an objective lens for collecting the light; and a light receiving portion to detect the light collected by the objective lens and reflected by the object and to check a positional relationship between the objective lens and the object based on an intensity of the detected light, wherein the light emitting portion and the light receiving portion are provided within a range of 1.22 $\lambda$/NA, in which a numerical aperture of the objective lens is represented by NA and a wavelength of the light of the light emitting portion is represented by $\lambda$, and an intensity of the reflected light can be detected by the light receiving portion.

With such a structure, the light emitting portion and the light receiving portion are formed in the beam waist of the reflected light. Therefore, the light receiving portion is present in a beam to be received if focal points are coincident with the surface of the object. And a beam diameter of the reflected light is large if the surface of the object is not focused, consequently, the amount of the received light is reduced. If the focal points are coincident with the surface of the object, all the reflected lights are detected so that the amount of the received light is increased. Thus, an intensity of the reflected light can be detected accurately. As a result, it is possible to detect that the object is set on a focusing point or a non-focusing point. Correspondingly, the position of the objective lens can be adjusted.

The present invention provides another form of a light receiving and emitting compound element comprises: a light emitting portion and a light receiving portion for receiving a light transmitted from the light emitting portion which is reflected by an object, thereby detecting information of the object, wherein the light receiving portion is multi-split and the light emitting portion and the light receiving portion are formed on the same substrate such that the light emitting portion is positioned on a central part of the light receiving portion.

With such a structure, for example, by generating an astigmatism in only the light reflected by the object and returned to the light receiving portion, even if the light transmitted from the light emitting portion and the light returned to the light receiving portion are not separated by the optical system, the focal position of the optical system can be automatically adjusted such that the beam of the light emitting portion forms an image on the object by the astigmatism method.

For example, the light emitting portion and the light receiving portion are formed on a single semiconductor substrate to be electrically isolated from each other.

The light receiving portion may be formed by a semiconductor substrate and the light emitting portion may be an organic EL element provided on the semiconductor substrate, and the light emitting portion, or the light receiving portion may be formed by a surface emitting laser and a photodiode which are formed on the same semiconductor substrate.

A second light receiving portion is further provided on an outside of the range of 1.22 $\lambda$/NA to be electrically isolated. Therefore, also in the case in which a shift is great in the xy plane so that the reflected light is not detected in the light receiving portion at all, for example, the reflected light can be detected by the second light receiving portion so that it can be known that a shift is great.

An optical pick-up device according to the present invention comprises: a light receiving and emitting compound element having a light emitting portion to irradiate a light toward an optical disk and a light receiving portion to detect the light reflected by the optical disk; an objective lens for collecting the light of the light emitting portion; a tracking servo mechanism and a focus servo mechanism which are driven through an output of the light receiving and emitting compound element wherein the light emitting portion and the light receiving portion are provided within a range of 1.22 λ/NA, in which a numerical aperture of the objective lens is represented by NA and a wavelength of the light of the light emitting portion is represented by λ, and a positional relationship between the objective lens and the optical lens based on an intensity of the reflected light can be detected by the light receiving portion.

The present invention provides a further form of an optical pick-up device comprising a light emitting portion, a lens system for collecting a light transmitted from the light emitting portion on an optical disk, and a light receiving portion for receiving the light reflected by the optical disk, thereby detecting information of the optical disk, wherein the light receiving portion is formed on the same substrate as the light emitting portion to be positioned around the light emitting portion, the light receiving portion is multi-split, and a focal position on the optical disk of the light transmitted from the light emitting portion can be detected by an astigmatism method. The multi-split implies that the split can be carried out to compare the amount of the received light in the x-axis direction with the amount of the received light in the y-axis direction, for example, that four-split is carried out.

With such a structure, the light emitting portion and the light receiving portion are formed on the same substrate by using the astigmatism method without a beam splitter such as a half mirror. Therefore, if the light emitting portion and the lens system are aligned, the receiving portion can be aligned automatically and assembly can be carried out very easily. Furthermore, the light emitting portion and the light receiving portion are formed integrally. Therefore, there is no possibility that a relative position might be moved by heat or the like. In addition, a case has a simple structure and the cost of parts can be reduced considerably.

In a specific structure for carrying out the focus servo by the astigmatism method, a first optical element for generating an astigmatism on the light reflected by the optical disk and returned is provided on only a surface of the light receiving portion. The optical element for generating an astigmatism implies an element such as a cylindrical lens and an optical element of which focal position is shifted on the x axis and y axis such as a parallel transparent substrate provided to have a constant inclination with respect to a beam axis.

In another specific structure for carrying out the focus servo by the astigmatism method, a second optical element for generating an astigmatism is provided on only a front surface of the light emitting portion and a third optical element for offsetting the astigmatism generated by the second optical element is provided between the light emitting portion and the optical disk to cover a portion of the light returned to the light receiving portion or the light emitting portion is formed to cause an optical beam emitted from the light emitting portion to have an astigmatism and a third optical element for offsetting the astigmatism is provided between the light emitting portion and the optical disk to cover a portion of the light returned to the light receiving portion.

The third optical element for offsetting the astigmatism implies such an optical element as to generate an astigmatism at almost the same rate in a reverse direction to that of the second optical element. For example, it is possible to use a cylindrical lens having a concave portion for canceling the effects of the convex cylindrical lens, a transparent substrate inclined in such a direction as to cancel the lens effects of the second optical element and the like.

Furthermore, a fourth optical element for generating a small astigmatism may be inserted between the light emitting portion as well as the light receiving portion and the optical disk and may be formed to generate such an astigmatism that an optical beam transmitted from the light emitting portion is collected on the optical disk with a spot having no hindrance when a signal of the optical disk is to be detected. Thus, when the beam transmitted from the light emitting portion is to be collected on the optical disk, a small astigmatism is generated. If the minimum diameter of the beam spot based on the astigmatism is approximately 2 μm or less, information can be detected without a hindrance. The light reflected by the optical disk and returned to the light receiving portion is transmitted through the fourth optical element for generating an astigmatism again. Therefore, the astigmatism becomes a double so that a focal shift can be detected by the astigmatism method.

Additional two sets of light emitting portions and light receiving portions which can detect a shift in a track of the optical disk are formed on the same substrate as that on which the multi-split light receiving portion is provided in addition to the light emitting portion for detecting a focal position and the multi-split light receiving portion. Thus, since the light emitting portion and the light receiving portion are simultaneously formed on the same substrate, a very accurate positional relationship can be obtained, an expensive part such as a diffraction grating is not employed and a beam can be used as a signal for a tracking servo.

DETAILED DESCRIPTION

Figure 1:
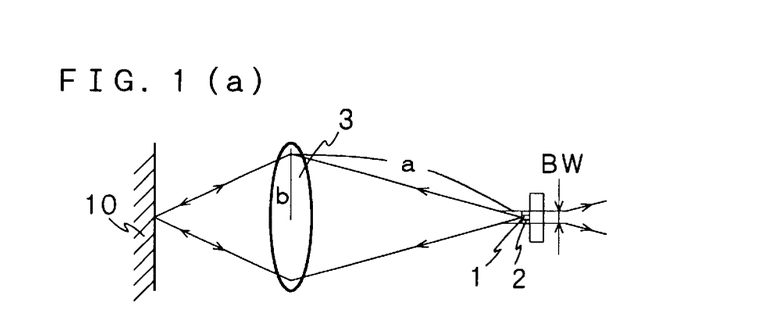
FIGS. 1(a) to 1(e) are diagrams illustrating a structure of a light receiving and emitting compound element according to an embodiment of the present invention.

Next, a light receiving and emitting compound element according to the present invention and an optical pick-up device using the light receiving and emitting compound element will be described with reference to the drawings. As shown in FIG. 1(a) illustrating a structure according to an embodiment, the light receiving and emitting compound element according to the present invention comprises a light emitting portion 1, an objective lens 3 for collecting a light of the light emitting portion 1, a light receiving portion 2 provided in the vicinity of the light emitting portion 1 such that a light collected by the objective lens 3 and reflected by an object, for example, an optical disk 10 can be detected. As shown in an example of a structure of a plane of FIGS. 1(b) to 1(d), for example, the light emitting portion 1 and the light receiving portion 2 are formed within a range of 1.22 $\lambda$/NA (beam waist BW), wherein a numerical aperture of the objective lens 3 is represented by NA and a wavelength of the light emitting portion 1 is represented by $\lambda$. The light receiving portion 2 serves to detect an intensity of a light reflected by the object such as the optical disk 10. The numerical aperture NA is represented by b/a in FIG. 1(a).

Figure 2:
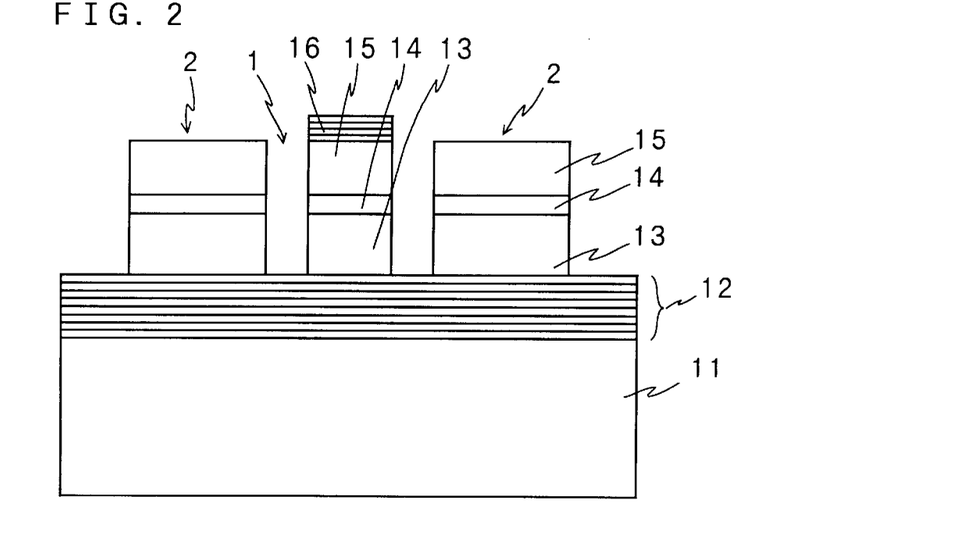
FIG. 2 is a sectional view illustrating an example of structures of a light emitting portion and a light receiving portion shown in FIGS. 1(a) to 1(e)

For example, a surface emitting LD can be used for the light emitting portion 1. As shown in FIG. 2, a structure includes a lower layer DBR (Distributed Brag Reflector) 12 having AlAs and GaAs alternately multilayered with a thickness of $\lambda$/4n ($\lambda$ represents a wavelength and n represents an index of refraction) on a GaAs substrate 11, a clad layer 13 having $Al_{0.6}Ga_{0.4}As$ constituting a part of a longitudinal type resonator, an active layer 14 having $Al_{0.2}Ga_{0.8}As$ or a multiple quantum well structure, for example, a clad layer 15 having $Al_{0.6}Ga_{0.4}As$ constituting a part of the longitudinal type resonator, and an upper layer DBR 16 in the same manner as described above. An electrode formed of a metal film (not shown) is provided on the upper and lower surfaces, and the light emitting portion 1 has a diameter of approximately 3 $\mu$m, for example.

As shown in FIG. 2, the light receiving portion 2 having the same lamination structure as that of the light emitting portion 1 except the upper layer DBR 16 is formed around the light emitting portion 1. The light receiving portion 2 has an outside diameter with a beam waist BW (1.22 $\lambda$/NA). As described above, the present inventors have made investigations vigorously. As a result, by utilizing the fact that the influence of the diffraction of a lens cannot be avoided based on the wave motion of a light and the beam waist BW is necessarily formed by the diffraction phenomenon as shown in FIG. 1(a), the light receiving portion 2 is formed within the beam waist BW. Consequently, the light receiving portion 2 is always provided in the beam waist of the reflected light separately from the light emitting portion 1.

If the light emitting portion 1 and the light receiving portion 2 are wholly provided within the beam waist BW, the relationship between the light emitting portion 1 and the light receiving portion 2 is rarely restricted. As shown in the plan views of FIGS. 1(b) to 1(e), for example, various structures can be employed. More specifically, in the structure shown in FIG. 1(b) illustrating an example of FIG. 2 seen from a top surface, the light emitting portion 1 is formed in a central part and the light receiving portion 2 is formed therearound. In an example of FIG. 1(c), a plurality of light emitting portions 1 are provided. In the case in which the light emitting portions 1 are provided, it is preferable that they should be symmetrical with respect to a center because a beam of a reflected light can easily be constant. In a structure shown in FIG. 1(d), moreover, the light emitting portion 1 and the light receiving portion 2 are provided alternately in a direction of rotation of a circle. In a structure shown in FIG. 1(e), the light receiving portion 2 is provided in a central part and the light emitting portion 1 is provided therearound. The central part has the highest light intensity within the beam waist of the reflected light. Therefore, even if an area of the light receiving portion 2 is reduced with such a structure, a light can be received in a large amount.

In addition to this example, a light emitting element such as an LED or the like can be used for the light emitting portion 1 in place of the LD because a light is irradiated within a small range and a directivity can be therefore obtained. In the case in which a small-sized light emitting element is to be formed, an organic EL element can easily be fabricated. For example, the organic EL element is formed on a silicon substrate and the organic EL can be used as the light emitting portion 1 and the silicon substrate can be used as the light receiving portion 2.

Figure 4:
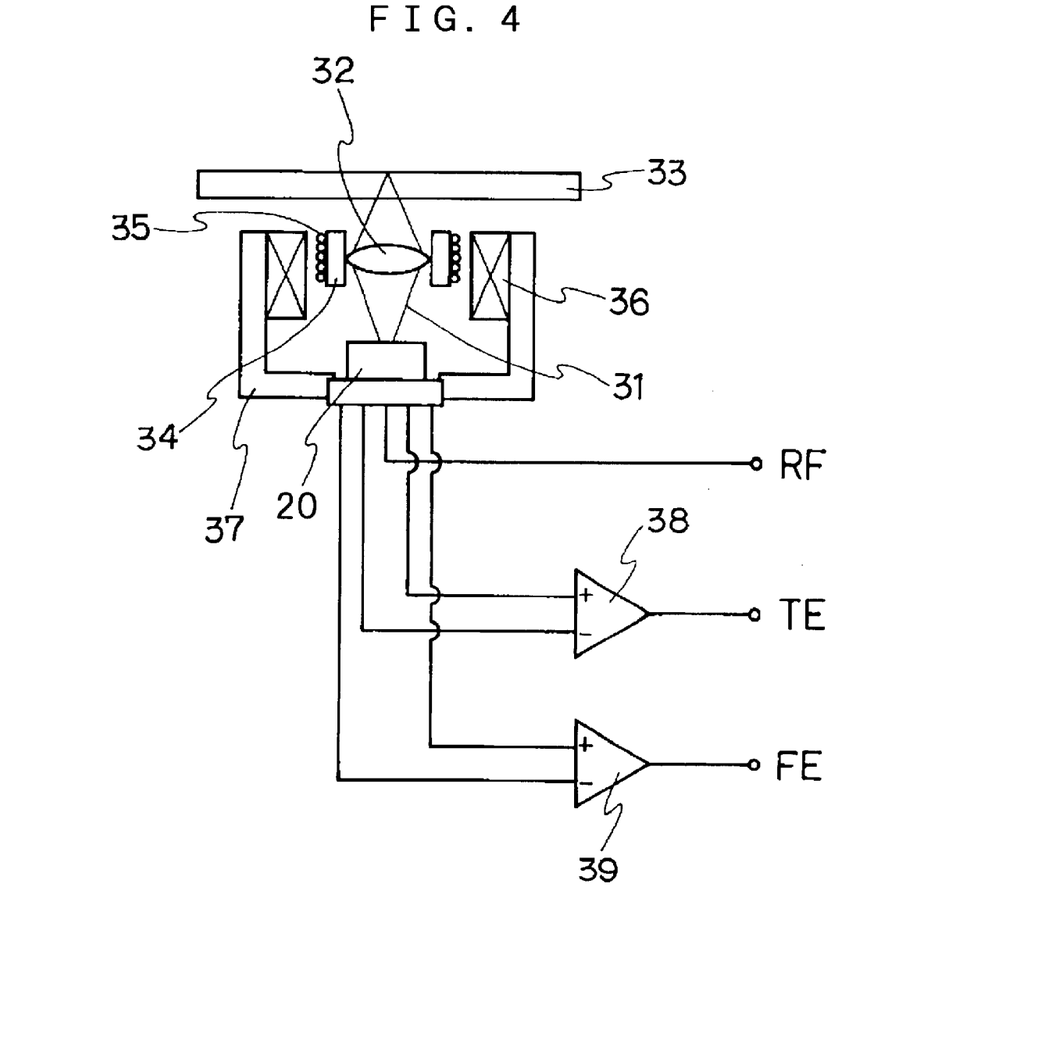
FIG. 4 is a diagram illustrating an example in which a optical pick-up device is constituted by using the light receiving and emitting compound element according to the present invention.

A convex lens formed of plastics or the like which is used for an ordinary pick-up device or the like is employed for the objective lens 3. In the case in which the objective lens 3 is to be employed for an optical pick-up device or the like and is to be used together with a servo mechanism for correcting a shift which is not shown, an electromagnetic coil is attached to the objective lens 3 such that a position can be adjusted between the electromagnetic coil and a magnet provided adjacently thereto and an adjusting mechanism for optimizing a reflected light which is detected is provided as shown in FIG. 4 which will be described below, for example.

Next, an example in which an optical pick-up device is constituted by using the light receiving and emitting compound element will be described with reference to FIGS. 4 and 5. In FIG. 4, a laser beam 31 emitted from a light receiving and emitting compound element portion 20 is transmitted through an objective lens 32 fixed to a lens holder 34 and two detection signals of the light receiving portion which are generated through the light reflected by a recording surface of an OD (optical disk) 33 (only a light transmitted from one light emitting portion is shown in the drawing and the detection signals can be obtained by an astigmatism method or a 3-beam method using a diffraction grating or the like or provision of two light receiving and emitting compound elements which are slightly shifted in a cross direction of a focal point or a track as will be described below) are compared and amplified by differential amplifying circuits 38 and 39 respectively and are changed into a tracking error signal TE and a focus error signal FE, and a recording signal RF of the OD is directly sent to a signal processing circuit. By the servo mechanism to be driven in response to the tracking error signal TE and the focus error signal FE, the position of the objective lens 32 is adjusted by a combination of an electromagnetic coil 35 and a permanent magnet 36 provided in a case 37.

Figure 5A:
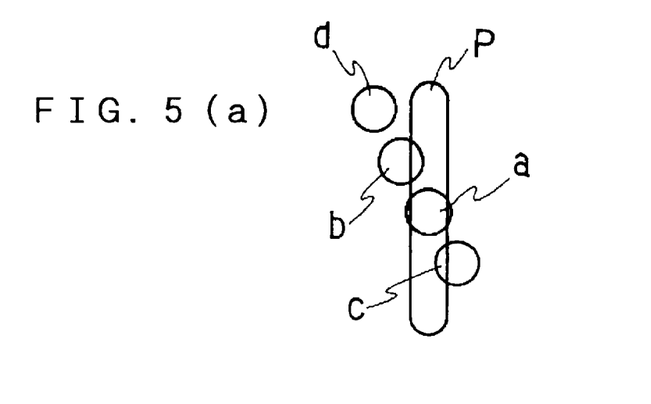
FIGS. 5(a) to 5(d) are diagrams illustrating a principle in which a tracking servo of the optical pick-up device is carried out.
Figure 5B:
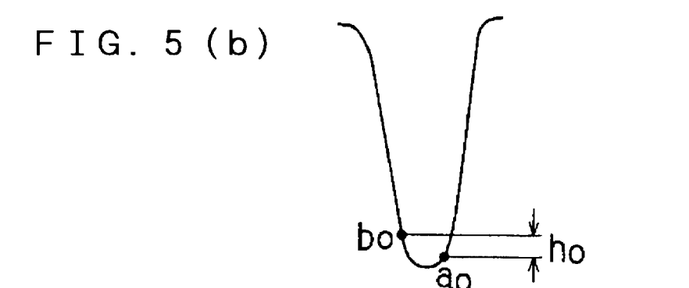
Figure 5C:
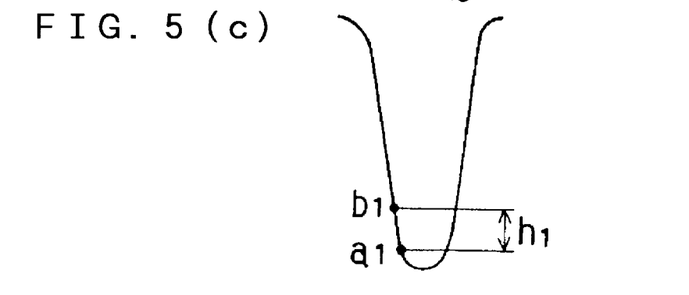
Figure 5D:
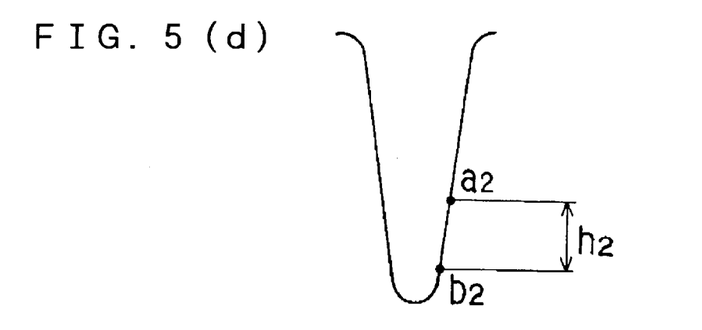

First of all, description will be given to a basic thinking manner for a method of detecting the tracking error signal with the above-mentioned structure. In the case in which a light transmitted from the light emitting portion is to form a spot on the optical disk, a small reflectance is obtained and a small return light is transmitted when a spot hits on a pit P recorded on the optical disk as shown in a of FIG. 5(a), and a great reflectance is obtained and a great return light is transmitted when a spot of a beam transmitted from the light emitting portion is not formed on the pit P as shown in d of FIG. 5(a). When a part is formed on the pit P and another part is not formed on the pit P as shown in b and c of FIG. 5(a), the amount of the return light is varied depending on an area where the beam spot is not formed on the pit P. If the return light is transmitted in a large amount, an output of the light receiving portion is increased. Therefore, if the output of the light receiving portion is monitored, the output of the light receiving portion is varied depending on the position of the beam spot as shown in FIGS. 5(b) to 5(d) illustrating the output of the light receiving portion obtained when a center of the beam spot is displaced in a direction perpendicular to a track direction.

For example, accordingly, two sets of light emitting portions and light receiving portions are provided for the tracking servo and detection is carried out through outputs PD1 and PD2 of the light receiving portion. As shown in FIG. 5(b), consequently, if a difference $h_0$ between an output $a_0$ of the PD1 and an output $b_0$ of the PD2 is set within a constant range, the positions of the spots of LD1 and LD2 are normal and a tracking error is not made. On the other hand, as shown in FIG. 5(c), a value of $a_1-b_1$ is negative in which $a_1$ represents the output of the PD1 and $b_1$ represents the output of the PD2, and the position of the spot should be corrected toward the right side in FIG. 5(a) if an absolute value is greater than a specified value. By driving a directly connected servo motor, a tracking error can be corrected. As shown in FIG. 5(d), furthermore, a value of $a_2-b_2$ is positive in which $a_2$ represents the output of the PD1 and $b_2$ represents the output of the PD2, and the position of the spot should be corrected in an opposite direction to the above-mentioned direction if an absolute value is greater than a specified value. Thus, the position of the spot can be corrected by the servo motor.

For a focus error signal, similarly, two sets of light emitting portions and light receiving portions may be provided. By using the astigmatism method as will be described below, a focus error can be corrected in the same manner through an output of the light receiving portion which is multi-split. More specifically, if a focus is not brought, a small amount of the light is returned to the light receiving portion and the output of the light receiving portion is reduced. Therefore, it is possible to know that a difference in the two light receiving portions is shifted in a positive or negative direction. The shift can be corrected by the servo motor such that the difference gets in a range of a predetermined value.

Figure 3:
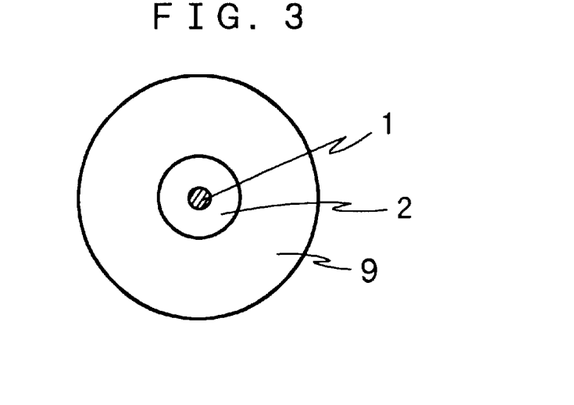
FIG. 3 is a diagram illustrating a structure of a light receiving and emitting compound element according to another example of the present invention.

In the above-mentioned example, if a small number of tracking errors are made, they can be detected depending on sizes through the light receiving portion 2. However, in the case in which the tracking error greatly gets out of the range, it cannot be detected by the light receiving portion 2 at all. In such a case, a second light receiving portion 9 is provided separately from the light receiving portion 2 on the periphery thereof as shown in FIG. 3. Even if the reflected light is returned in a shifted direction, it can be received by the second light receiving portion 9 and the shift can be detected.

According to the present invention, the light emitting portion and the light receiving portion are provided in the beam waist of the reflected light. Therefore, it is not necessary to form the light emitting portion and the light receiving portion separately and to align both of them. Thus, assembly can be carried out very easily. More specifically, the light receiving portion is provided in a minimum beam by utilizing such an optical property that a beam cannot always have a constant diameter or less due to the diffraction phenomenon of the lens. Therefore, the amount of the received light is surely varied depending on whether a focus is brought or not. Consequently, the shift can be detected accurately.

Figure 6A:
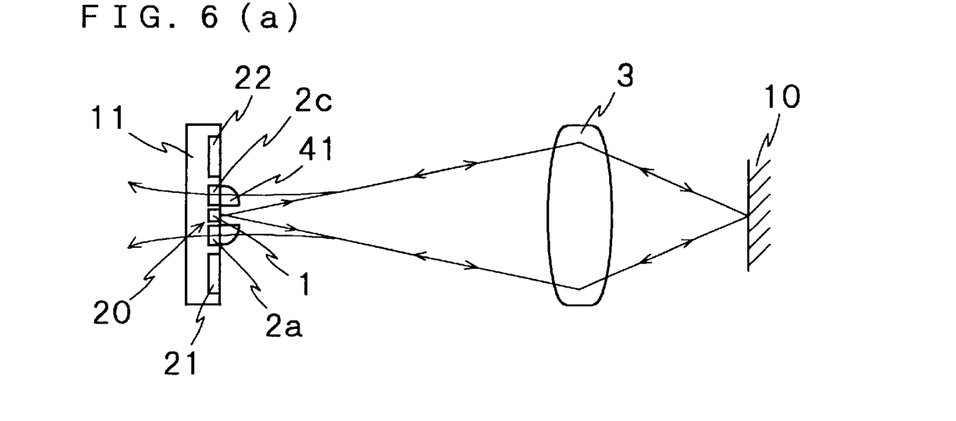
FIGS. 6(a) to 6(c) are diagrams illustrating an optical pick-up device using a light receiving and emitting compound element according to another embodiment of the present invention.
Figure 6B:
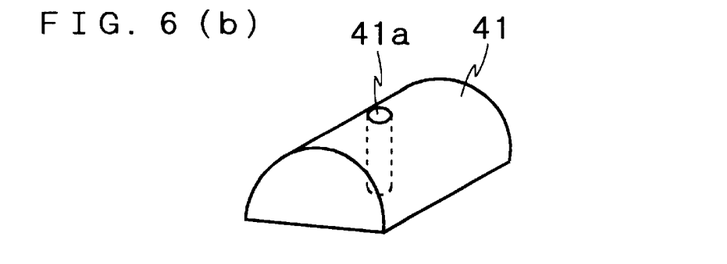
Figure 6C:
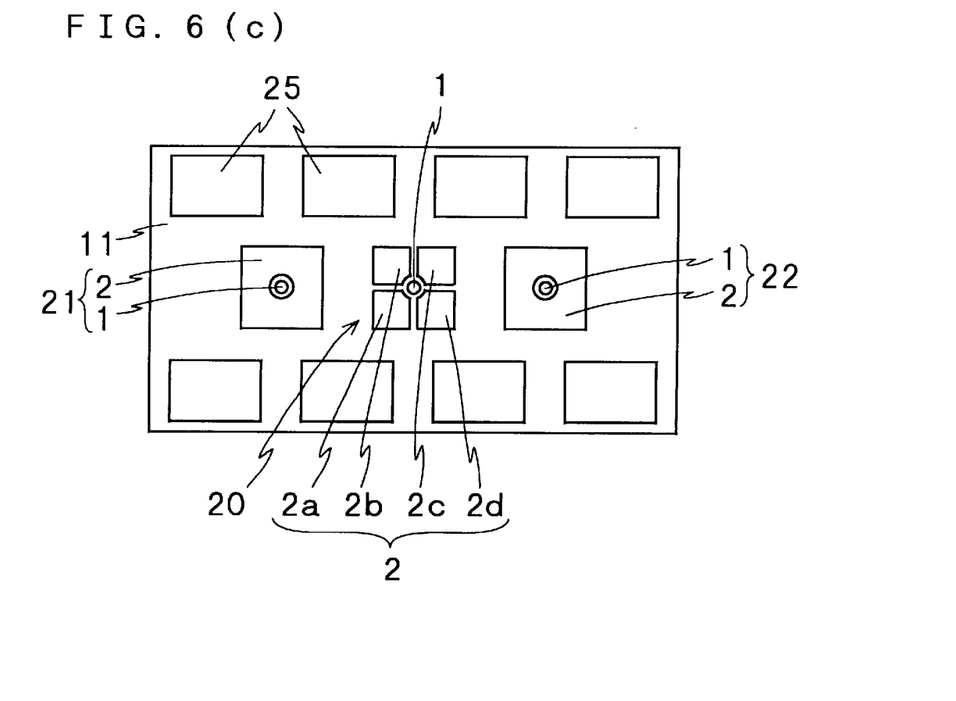

In a light receiving and emitting compound element according to another embodiment of the present invention, a light emitting portion 1 and a light receiving portion 2 (2a, 2b, 2c, 2d) are formed on the same substrate 11, the light receiving portion 2 is split into four portions and the light emitting portion 1 is positioned in a central part of the light receiving portion 2 as shown in a conceptual view of FIG. 6(a) illustrating an example in which the light receiving and emitting compound element is used in an optical pick-up device and a plan view of FIG. 6(c) illustrating a light receiving and emitting compound element 20. The light receiving portion 2 is formed such that a light transmitted from the light emitting portion 1 is collected on an object 10 such as an optical disk through a lens system 3 including a collimator and an objective lens and the light reflected from the object 10 is received so that information of the object 10 can be detected. In the example of FIG. 6, there are also provided light receiving and emitting compound elements 21 and 22 including a light emitting portion and a light receiving portion for carrying out the tracking servo of the optical pick-up device. The reference numeral 25 denotes an electrode pad which is electrically connected to each of the light emitting portion 1 and the light receiving portion 2 through a wiring which is not shown.

The surface emitting LD shown in FIG. 2 can be used for the light emitting portion 1, for example. As shown in FIG. 2, moreover, the light receiving portion 2 also has the same lamination structure as that of the light emitting portion 1 provided around the light emitting portion 1, and an upper layer DBR 16 is removed by etching or the like. The light receiving portion 2 of the light receiving and emitting compound element 20 for obtaining an RF signal and a focus servo signal is split into four portions (2a, 2b, 2c, 2d) which are formed electrically independently as shown in the plan view of FIG. 6(c). An isolating trench is formed between the light emitting portion 1 and the light receiving portion 2 and between the split light receiving portions 2 through etching as shown, an insulator such as polyimide is filled in the isolating trench and an oxygen ion or the like is implanted without the etching so that a semiconductor layer is insulated. Thus, electrical isolation can be carried out.

Figure 8:
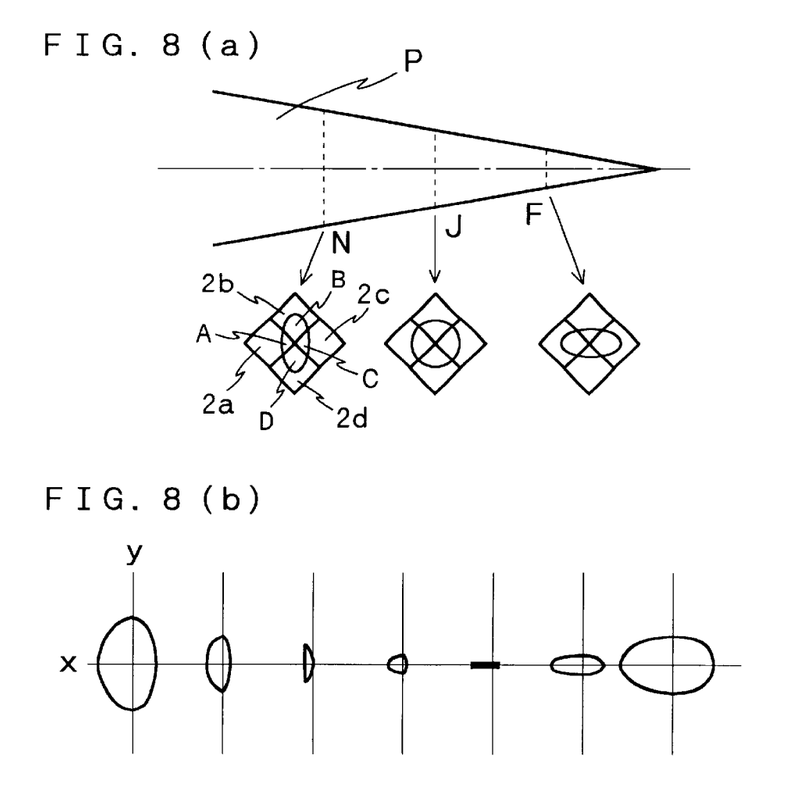
FIGS. 8(a) and 8(b) are diagrams illustrating a principle in which a focal position is aligned by an astigmatism method.

The reason why the light receiving portion 2 is split into four portions is that a focal point can be adjusted by the astigmatism method. If outputs in x-axis and y-axis directions can be compared with each other, the four-split is not restricted. As shown in FIGS. 8(a) and 8(b), for example, in the case in which a beam P generating an astigmatism is to be received, outputs A and C of the split light receiving portions 2a and 2c are small and outputs B and D of the split light receiving portions 2b and 2d are great so that they are too close if the light receiving portion 2 is set in a position N, the outputs A, B, C and D of the light receiving portions are equal to each other in a focal position if the light receiving portion is set in a position J, and the outputs A and C are great and the outputs B and D are small so that they are too distant if the light receiving portion is set in a position F. More specifically, it is immediately apparent that the outputs are too close if (A+C)−(B+D) is negative, are good if (A+C)−(B+D) is 0, and are too distant if (A+C)−(B+D) is positive. The reason is as follows. If the astigmatism is formed on a beam, a shift is generated in a position where the sectional shape of the beam is focused on x and y axes, and a diameter is varied in x and y directions as shown in FIG. 8(b) in which the sectional shape of the beam is changed depending on a beam position.

Figure 7:
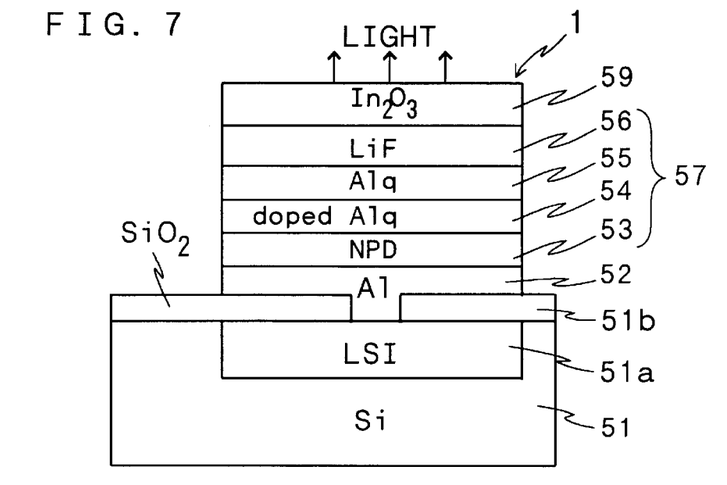
FIG. 7 is a sectional view illustrating another example of a light emitting portion shown in FIGS. 6(a) to 6(c)

In the above-mentioned example, the surface light emission type LD has been used for the light emitting portion 1 and the semiconductor layer having the same lamination structure as that of the light emitting portion 1 has been used as a photodiode for the light receiving portion 2. If the organic EL element is formed as the light emitting portion 1 on a silicon substrate, for example, a light receiving portion can be formed on the silicon substrate and an IC such as a circuit for carrying out the above-mentioned calculation can be directly fabricated on the silicon substrate. FIG. 7 is a sectional view showing an example of a structure of the organic EL light emitting element.

In FIG. 7, a first electrode 52 formed of Al, Cu, Mg, Ag or the like is provided such that it is connected to an output electrode of a control circuit (LSI) formed on a substrate 51 formed of silicon or the like through a contact hole of an insulating film 51b formed of $SiO_2$ or the like, and an organic layer 57 having at least an EL light emitting layer 54 is provided on the first electrode 52. A second electrode 59 having a light transmitting property which is formed of indium oxide or the like is provided on the organic layer 57. The organic layer 57 includes a hole transporting layer 53 formed of NPD, for example, an EL light emitting layer 54 formed of Alq doped with 1% by weight of quinacridone or coumalin, an electron transporting layer 55 formed of Alq, and an electron injecting layer 56 formed of LiF. A light receiving portion (not shown) for an RF signal and a focus signal is formed on the silicon substrate 51 through the 4-split as described above. The light emitting portion 1 is formed by providing an electrode and an organic layer on the silicon substrate 51 and then carrying out patterning.

According to the light receiving and emitting compound element in accordance with the present embodiment, the light receiving portion is formed on the same substrate as the light emitting portion such that the light receiving portion is positioned around the light emitting portion. Therefore, a beam is irradiated from the light emitting portion and a light reflected by a forward object and then returned can be directly received by the light receiving portion provided therearound. Thus, information about the object can be known. More specifically, the beam irradiated from the light emitting portion and reflected by the object passes through the optical system twice so that a diameter of a beam waist is increased to approximately 10 $\mu$m at a minimum. Therefore, the beam can be detected reliably by the light receiving element. In addition, the light receiving element is multi-split into four portions, for example. Therefore, it is possible to easily know that the object is set in an accurate focal position or not and it is too close or distant through the astigmatism method by generating an astigmatism on the beam reflected by the object. As a result, in the case in which a focal position is to be adjusted, for example, a focus servo of an optical pick-up device or the like, the focusing can be carried out with a simple structure without using a beam splitter or the like.

In the optical pick-up device according to the present invention using the light receiving and emitting compound element, for example, a first optical element formed of a kamaboko (boiled fish paste)-shaped, or barrel-roof-shaped lens (a cylindrical lens) 41 (see FIG. 6(b)), for example, is provided over the light receiving and emitting compound element 20 and a through hole 41a is formed in a portion positioned in the light emitting portion 1 of the kamaboko-shaped, or barrel-roof-shaped lens 41 as shown in FIG. 6(b). Then, the light is collected through the lens system 3 including a collimator lens, an objective lens and the like and is focused on a pit of the optical disk 10.

The kamaboko-shaped, or barrel-roof-shaped lens 41 is formed as follows. For example, a trench is formed on a substrate, a transparent resin such as PMMA is potted in the trench to have a constant length along the trench, and an upper surface side becomes convex-shaped and is then cured. Thus, the kamaboko-shaped, or barrel-roof-shaped lens 41 is formed. Alternatively, the resin such as PMMA is uniformly coated wholly and is cured, and is then pressed by a mold having a desirable shape. Thus, the kamaboko-shaped, or barrel-roof-shaped lens 41 is formed on the surface of the light receiving portion. A through hole 41a may be formed by the etching or the mold.

In the example of FIGS. 6(a) to 6(c), light receiving and emitting portions 21 and 22 in which a light receiving portion 2 is not split but a light emitting portion 1 is provided electrically independent of the light receiving portion 2 are formed on the same substrate 11 in addition to the light receiving and emitting compound portion 20 in which the light receiving portion 2 is split into four portions. More specifically, while three beams obtained by diffracting the beam transmitted from the light emitting portion using the diffraction grating have been used for the tracking servo signal in the conventional optical pick-up device, three sets of light emitting portions 1 and light receiving portions 2 are arranged without using the diffraction grating in the present invention. The light receiving and emitting portions 21 and 22 for the tracking servo can also be formed in the same process simultaneously with the formation of the light receiving and emitting compound portion 20 for the RF signal and the focus servo signal. A cost is rarely required, and furthermore, the formation can be carried out with an accurate positional relationship.

As described above, in the optical pick-up device according to the present embodiment, the light emitting portion and the light receiving portion can be formed on the same substrate with high precision and both of them are not required to be aligned. In addition, three sets can be formed on the same semiconductor substrate with high precision at the same time. Therefore, it is not necessary to use an expensive part such as a diffraction grating and to accurately set the positional relationship. Thus, manufacture can easily be carried out. In the case in which the diffraction grating is to be used in the same manner as that in the conventional structure, however, it is preferable that only the light receiving portion 2 should be provided in place of the light receiving and emitting portions 21 and 22. The light receiving portion 2 for a tracking servo is not required to be split into four portions. The tracking servo can be carried out in the same manner as that in the conventional art if the light emitting portion 1 is provided in the light receiving portion 2.

Next, the operation of the optical pick-up device will be described. Since a beam emitted from the light emitting portion 1 provided on the center of the four-split light receiving portions 2a, 2b, 2c and 2d is transmitted through the through hole 41a of the kamaboko-shaped, or barrel-roof-shaped lens 41, it advances without the influence of the kamaboko-shaped, or barrel-roof-shaped lens 41 and is collected on the optical disk 10 through the lens system 3. The beam reflected by the optical disk 10 is moved backward through the same path and is returned to the light receiving and emitting compound element 20 in the central part. In this case, a spot formed on the optical disk is further returned through the lens system 3. Therefore, a size of the thinnest beam waist portion of the collected beam is increased to approximately 10 μm. For this reason, the reflected light is also incident on the light receiving portion 2 provided around the light emitting portion 1. In addition, the kamaboko-shaped, or barrel-roof-shaped lens 41 is mounted on the surface side of the light receiving portion 2. Therefore, an astigmatism is generated. As a result, it is apparent that the beam transmitted from the light emitting portion is focused on the optical disk or not by calculating (A+C)−(B+D) based on the outputs of the four-split light receiving portions 2a to 2d. Thus, the focus servo can be carried out. The RF signal is obtained by (A+B+C+D).

Figure 9:
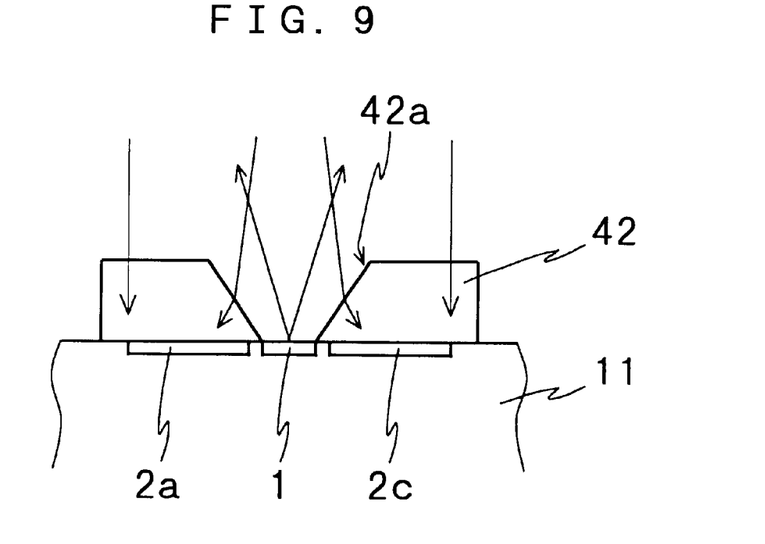
FIG. 9 is a diagram showing another example of a structure in which an astigmatism is generated in only a light receiving portion shown in FIGS. 6(a) to 6(c)

In the example shown in FIG. 6, the kamaboko-shaped, or barrel-roof-shaped lens (cylindrical lens) formed by scooping out the vicinity of the light emitting portion 1 is provided on the light receiving portion 2 so that an astigmatism is generated on only the light reflected by the optical disk 10. In place of the kamaboko-shaped, or barrel-roof-shaped lens, a planar transparent resin layer 42 is provided and only the vicinity of the light emitting portion 1 is scooped out such that a side wall thereof forms a slant face 42a as shown in FIG. 9. Consequently, an astigmatism is generated between a reflected beam transmitted through the slant face 42a portion and a reflected beam transmitted through a plane portion. As a result, similarly, the astigmatism can be generated on only the reflected light. Also in this case, the slant face can be formed through the etching or the mold. Furthermore, even if the kamaboko-like convex portion is not formed but a slant face is formed in a constant direction like an angular type or a roof type with a through hole provided in the light emitting portion on the central part which is not shown, the astigmatism can be generated.

Figure 10:
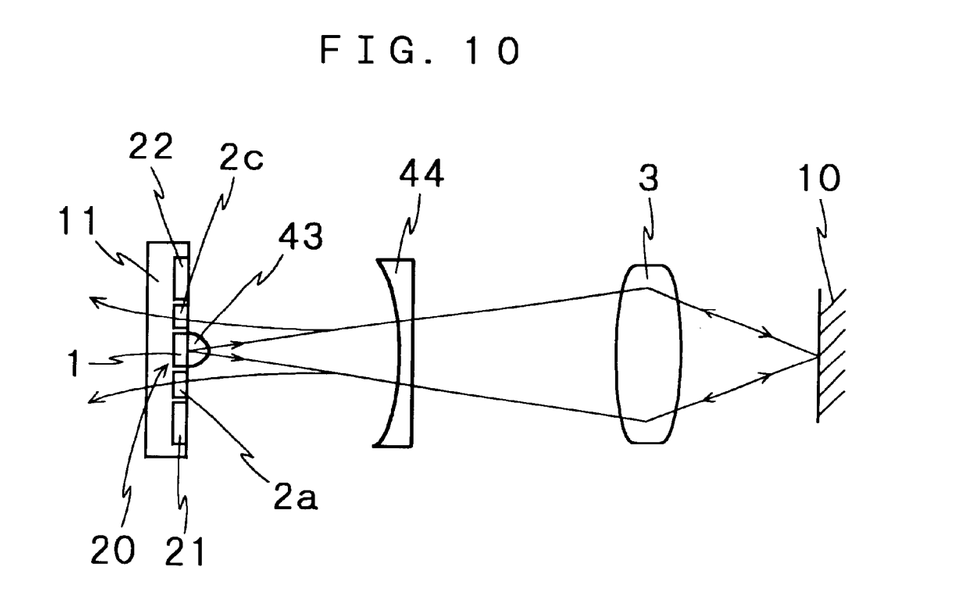
FIG. 10 is a diagram illustrating an optical pick-up device according to another embodiment of the present invention.

FIG. 10 is a diagram showing another example of the structure in which an astigmatism is not generated on a beam transmitted from the light emitting portion 1 to the optical disk 10 but is generated on a light reflected by the optical disk 10. More specifically, a second optical element 43 including a kamaboko-shaped, or barrel-roof-shaped lens, for example, is provided only ahead of the light emitting portion 1 to generate the astigmatism on only the light emitting portion 1, and a third optical element 44 such as a concave-shaped cylindrical lens which offsets the astigmatism generated by the kamaboko-shaped, or barrel-roof-shaped lens 43 is provided between the light emitting portion 1 and the lens system 3. As a result, the astigmatism of the beam transmitted from the light emitting portion 1 to the optical disk 10 is offset by the second optical element 43 and the third optical element 44, and a normal thin beam is focused on the optical disk.

On the other hand, the beam reflected by the optical disk 10 reaches the light receiving portion 2 through the third optical element 44. Therefore, an astigmatism is generated by the third optical element 44. As described above, therefore, it is apparent that the beam transmitted from the light emitting portion 1 is focused on the optical disk 10 or not based on the calculation of (A+C)−(B+D) through the outputs of the four-split light receiving portions 2a to 2d. Thus, the focus servo can be carried out.

Figure 11:
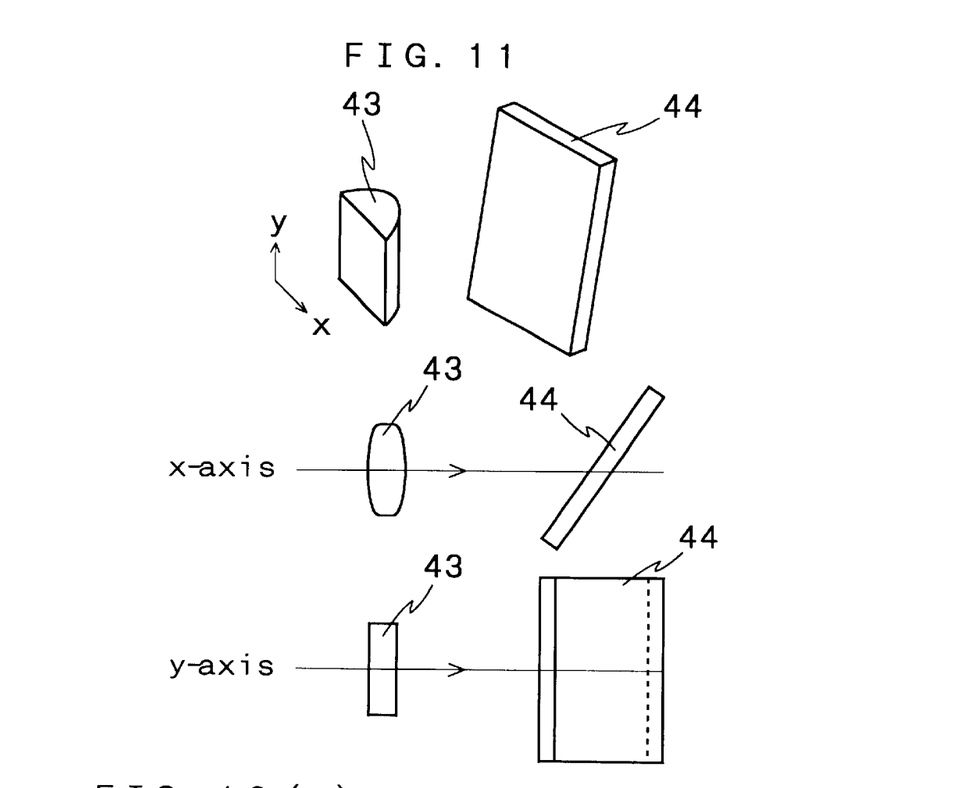
FIG. 11 is a diagram illustrating a variant of the example shown FIG. 10.

FIG. 11 is a diagram showing a variant of the example shown in FIG. 6. In place of the concave cylindrical lens, the third optical element 44 formed of a planar transparent substrate is inclined with respect to a beam axis such that an astigmatism generated by the second optical element 43 comprising a kamaboko-shaped, or barrel-roof-shaped lens is offset. As shown in FIG. 11, although the kamaboko-shaped, or barrel-roof-shaped lens 43 functions as a convex lens and the planar transparent substrate 44 is inclined with respect to the beam to offset the astigmatism of the kamaboko-shaped, or barrel-roof-shaped lens 43 for an x-axis component of the beam, both of them act as planes perpendicular to the beam for a y-axis component of the beam. Therefore, the beam transmitted from the light emitting portion 1 toward the optical disk 10 reaches the optical disk 10 without generating the astigmatism, and the beam reflected by the optical disk 10 and transmitted toward the light receiving portion 2 passes through only the inclined transparent substrate 44. Therefore, an astigmatism is generated in a focal position on the x-axis differently from a focal position on the y-axis. By regulating a thickness of the transparent substrate 44 and an inclination thereof, it is possible to obtain a desirable astigmatism which offsets the astigmatism of the kamaboko-shaped, or barrel-roof-shaped lens 43. However, in practice, even the case that the transparent substrate is not inclined, the astigmatism is generated, if the incident angle of the beam is unlike. So, the kamaboko-shaped lens is designed in the shape (aspherical surface) so as to cancel the astigmatism.

Figures 12A, 12B, 12C:
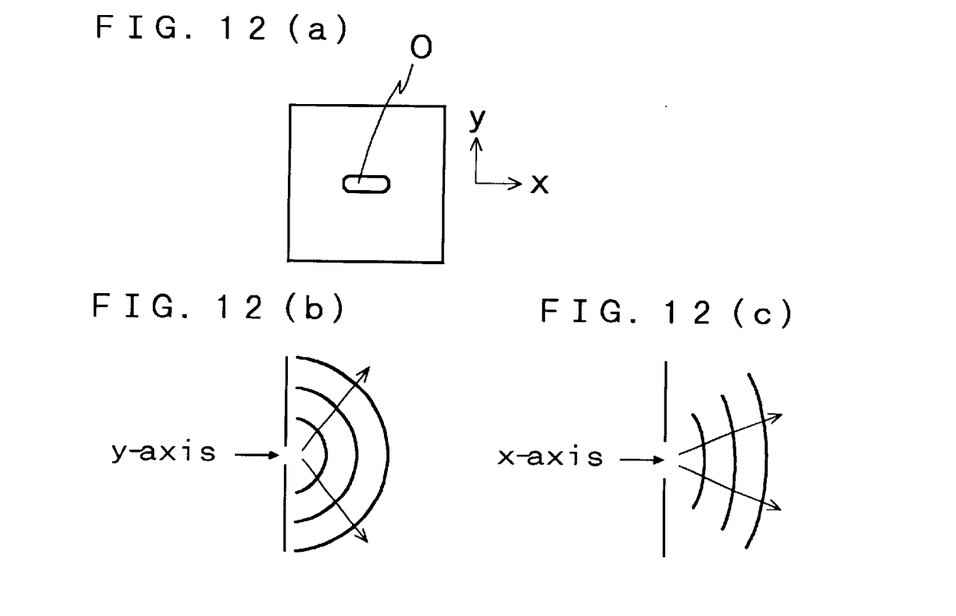
FIGS. 12(a) to 12(c) are diagrams illustrating another variant of the example shown in FIG. 10.

FIGS. 12(a) to 12(c) show another variant of the example in which the beam transmitted from the light emitting portion 1 has an astigmatism to be offset and the reflected light to reach the light receiving portion has an astigmatism. In this example, a light emitting surface O has an elliptic shape having lengths varied on the x and y axes as a method for causing the beam transmitted from the light emitting portion 1 to have an astigmatism as shown in a plan view of FIG. 12(a) illustrating the light emitting portion 1. As shown in FIGS. 12(b) and 12(c) illustrating a propagation waveform of a light transmitted through a general slit, a light transmitted through a slit having a small width (a small light source spot) advances while describing a circular wave surface and a light transmitted through a slit having a great width (a large light source spot) advances while describing a flat wave surface. As shown in FIG. 12(a), accordingly, the light transmitted from the elliptic light emitting surface has a beam expanded differently in the directions of the x and y axes. Consequently, an astigmatism is generated.

Figure 13A:
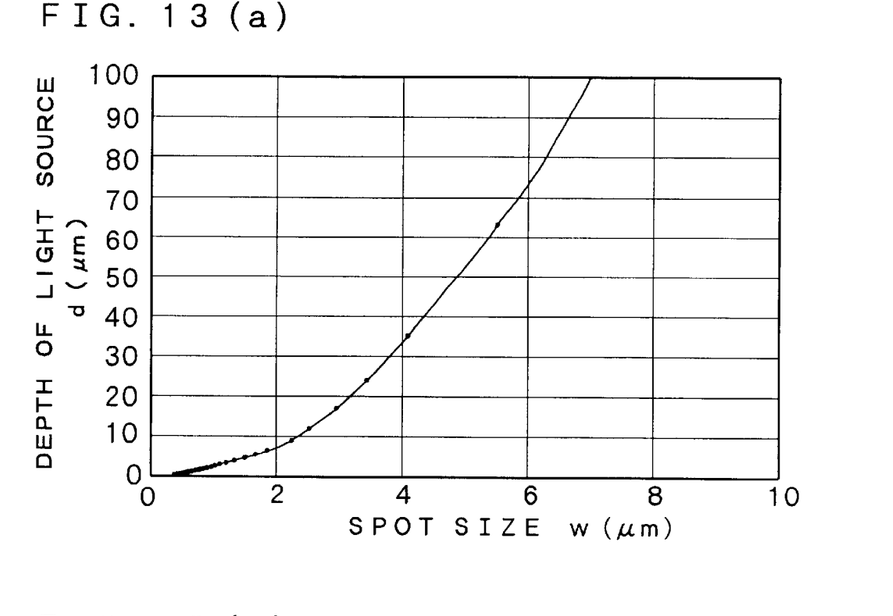
FIGS. 13(a) to 13(c) are diagrams illustrating the reason why a light emitting plane is elliptical to generate an astigmatism.
Figure 13B:
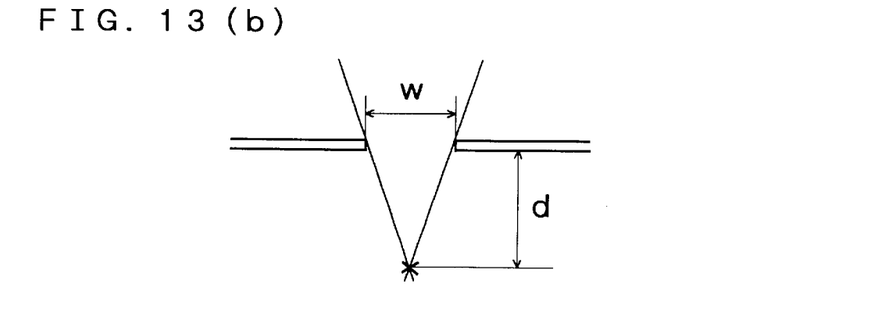
Figure 13C:
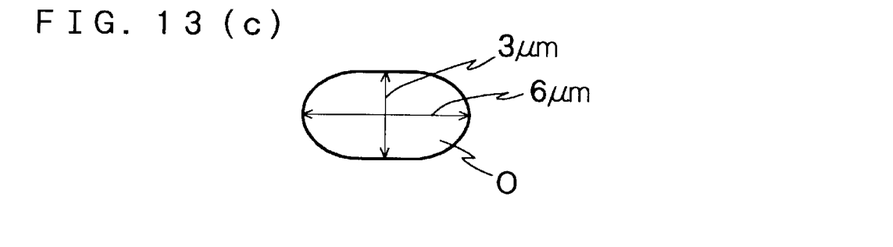

For example, a spot size (a width w of a slit) and a depth d (see FIG. 13(b)) of a light source have such a relationship that a light source is provided in a deeper portion if the spot size is increased as shown in FIG. 13(a). As shown in FIG. 13(c), for example, if the spot of the light emitting portion has an elliptical shape and sizes of 3 μm and 6 μm, the light source has depths of approximately 15 μm and 75 μm, respectively. More specifically, if the light emitting portion 1 takes an elliptical shape having a short diameter of 3 μm and a long diameter of 6 μm, an astigmatism for 60 μm is generated on the x and y axes. The third optical element 44 to offset the astigmatism is the same as that described above. It is preferable that an element to offset the astigmatism for 60 μm should be used.

Figure 14:
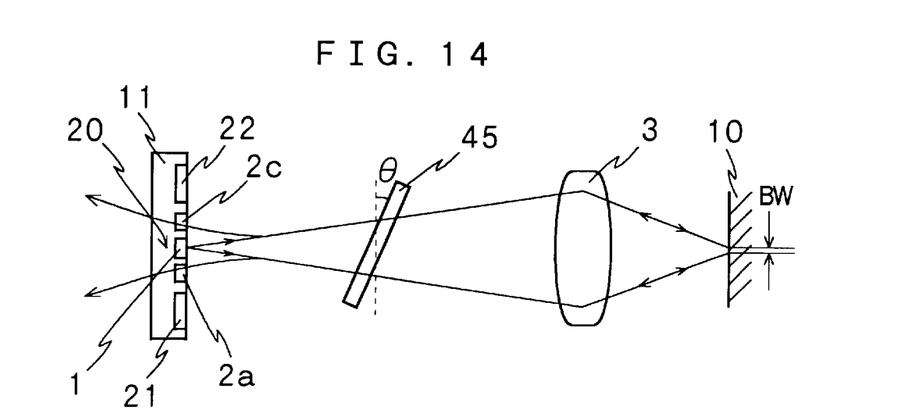
FIG. 14 is a diagram illustrating an optical pick-up device according to yet another embodiment of the present invention.

FIG. 14 is a diagram showing a further example of the structure in which the beam transmitted from the light emitting portion 1 to the optical disk 10 does not generate an astigmatism but the light reflected by the optical disk 10 generates an astigmatism. In this example, a fourth optical element 45 for generating a small astigmatism is provided between the light emitting portion 1 and the optical disk 10. In an example shown in FIG. 14, a transparent substrate having a small inclination θ is provided between the light emitting portion 1 and the optical disk 10. For example, if the astigmatism is great, a diameter of the beam waist BW portion having the thinnest beam is restricted to a constant range. Even if the beam waist BW portion has a size of approximately 2 μm, a pit of a CD or the like can be read without a hindrance. On the other hand, a beam having a spot thereof reflected by the optical disk and returned is transmitted through the fourth optical element 45 again. For this reason, therefore, it is possible to easily know that a distance between the light emitting portion 1 and the optical disk 10 is optimum or shifted in any direction by enlarging the astigmatism and calculating (A+C)−(B+D).

According to the present invention, in the case in which it is necessary to adjust the positional relationship between the light emitting portion and the object by detecting the reflected light in response to a detection signal sent from the light emitting portion, the detection can be carried out with a simple structure. As a result, it is possible to adjust a position when an image is to be directly formed on a retina of eyes as in an optical pick-up device or a head mount display and to easily carry out incorporation into a detector for detecting concavo-convex portions of a surface or the like.

For example, the head mount display to be mounted in front of the eyes can be seen without a feeling of physical disorder. Therefore, a personal computer can be wellable, resulting in a considerable contribution to the spread of a wellable computer.

According to the light receiving and emitting compound element in accordance with the second embodiment of the present invention, furthermore, the light emitting portion and the light receiving portion are formed on the same substrate. Therefore, in the case in which the light irradiated from the light emitting portion and reflected by the object is to be received by the light receiving portion, it is not necessary to separate beams for reciprocation through a beam splitter or the like, and furthermore, it is not necessary to align the optical axes of the light emitting portion and the light receiving portion and the degree of their connection can be increased greatly. In addition, the light receiving portion is multi-split into four portions. Therefore, focusing can be carried out by the astigmatism method.

According to the optical pick-up device of the present invention using the light receiving and emitting compound element, moreover, it is not necessary to align the optical axes of the light emitting portion and the light receiving portion in order to carry out the focus servo. In addition, it is not necessary to use the beam splitter such as a half mirror or a hologram. Furthermore, an expensive material generating thermal expansion with difficulty has conventionally been used as a case for fixing both the light emitting element and the light receiving element such that their mutual positions do not fluctuate. However, an inexpensive material is enough. Consequently, the charge of parts and assembly man-day can be reduced considerably. Thus, the cost can be greatly cut down.

Moreover, the light receiving and emitting compound element for the tracking servo is formed on the same substrate in addition to the light receiving and emitting compound element for the RF signal and the focus signal. Consequently, the light receiving and emitting portion can also be formed in the same process simultaneously with the formation of the light receiving and emitting portion for the RF signal and the like. Thus, the cost for the formation of the light receiving and emitting portion is not increased and an expensive part such as a diffraction grating is not required to be used. Furthermore, the cost can be cut down.

Although preferred example have been described in some detail it is to be understood that certain changes can be made by those skilled in the art without departing from the spirit and scope of the invention as defined by the appended claims.

What is claimed is:

1. A light receiving and emitting compound element comprising:
    a light emitting portion to irradiate a light toward an object through an objective lens for collecting the light; and
    a light receiving portion to detect the light collected by said objective lens and reflected by said object and to check a positional relationship between said objective lens and said object based on an intensity of the detected light;
    wherein said light emitting portion and said light receiving portion are provided within a range of 1.22 $\lambda$/NA, in which a numerical aperture of the objective lens is represented by NA and a wavelength of the light of said light emitting portion is represented by $\lambda$, and an intensity of the reflected light can be detected by said light receiving portion.

2. A light receiving and emitting compound element comprising:
    a light emitting portion; and
    a light receiving portion for receiving a light transmitted from said light emitting portion which is reflected by an object, thereby detecting information of the object;
    wherein said light receiving portion is multi-split and said light emitting portion and said light receiving portion are formed on the same substrate such that said light emitting portion is positioned on a central part of said light receiving portion.

3. The light receiving and emitting compound element of claim 1 or 2, wherein said light emitting portion and said light receiving portion are formed on a single semiconductor substrate to be electrically isolated.

4. The light receiving and emitting compound element of claim 1 or 2, wherein said light receiving portion is formed by a semiconductor substrate and said light emitting portion is formed by an organic EL element provided on said semiconductor substrate.

5. The light receiving and emitting compound element of claim 1 or 2, wherein said light emitting portion and said light receiving portion are a surface emitting laser and a photodiode which are formed on the same semiconductor substrate.

6. The light receiving and emitting compound element of claim 1, further comprising a second light receiving portion electrically isolated on an outside of the range of 1.22 $\lambda$/NA.

7. An optical pick-up device comprising:
    a light receiving and emitting compound element having a light emitting portion to irradiate a light toward an optical disk and a light receiving portion to detect the light reflected by said optical disk;
    an objective lens for collecting the light of said light emitting portion;
    a tracking servo mechanism and a focus servo mechanism which are driven through an output of said light receiving and emitting compound element;
    wherein said light emitting portion and said light receiving portion are provided within a range of 1.22 $\lambda$/NA, in which a numerical aperture of the objective lens is represented by NA and a wavelength of the light of said light emitting portion is represented by λ, and a positional relationship between said objective lens and said optical lens based on an intensity of the reflected light can be detected by said light receiving portion.

8. An optical pick-up device comprising:

a light emitting portion;

a lens system for collecting the light transmitted from said light emitting portion on an optical disk; and a light receiving portion for receiving the light reflected by said optical disk, thereby detecting information of said optical disk;

wherein said light receiving portion is formed on the same substrate as said light emitting portion to be provided around said light emitting portion, said light receiving portion is multi-split, and a focal position on said optical disk of the light transmitted from said light emitting portion can be detected by an astigmatism method.

9. The optical pick-up device of claim 8, wherein a first optical element for generating an astigmatism of the light reflected by said optical disk and returned is provided on only a surface of said light receiving portion.

10. The optical pick-up device of claim 8, wherein a second optical element for generating an astigmatism is provided on only a front surface of said light emitting portion and a third optical element for offsetting the astigmatism generated by said second optical element is provided between said light emitting portion and said optical disk to cover a portion of the light returned to said light receiving portion.

11. The optical pick-up device of claim 8, wherein said light emitting portion is formed to cause an optical beam emitted from said light emitting portion to have an astigmatism and a third optical element for offsetting the astigmatism is provided between said light emitting portion and said optical disk to cover a portion of the light returned to said light receiving portion.

12. The optical pick-up device of claim 8, wherein a fourth optical element for generating a small astigmatism is inserted between said light emitting portion as well as said light receiving portion and said optical disk and is formed to generate such an astigmatism that an optical beam transmitted from said light emitting portion is collected on said optical disk with a spot having no hindrance when a signal of said optical disk is to be detected.

13. The optical pick-up device of claim 8, wherein additional two sets of light emitting portions and light receiving portions which can detect a shift in a track of said optical disk are formed on the same substrate as that on which said light emitting portion and said light receiving portion which is multi-splitted, for detecting a focal position, are provided.

* * * * *